United States Patent
Holmberg

(10) Patent No.: US 6,540,855 B1
(45) Date of Patent: Apr. 1, 2003

(54) METHOD OF INTERCONNECTING TWO ELEMENTS

(75) Inventor: Per Holmberg, Dalby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/504,931

(22) Filed: Feb. 16, 2000

(30) Foreign Application Priority Data

Feb. 18, 1999 (SE) .............................................. 9900575

(51) Int. Cl.⁷ ................................................ B65B 7/28
(52) U.S. Cl. .......................... 156/69; 156/292; 156/293
(58) Field of Search ........................ 156/69, 293, 292, 156/73.5, 73.1; 174/50, 66, 67; 403/270, 268; 361/724, 752; 220/3.8, 4.01, 4.02, 4.05, 613, 615, 618, 621, 684, 685

(56) References Cited

U.S. PATENT DOCUMENTS

| | | | | |
|---|---|---|---|---|
| 3,934,747 A | * | 1/1976 | Needt ........................ 220/5 R |
| 5,190,803 A | * | 3/1993 | Goldbach et al. ........... 428/138 |
| 5,591,364 A | * | 1/1997 | Suppelsa ..................... 219/201 |
| 5,792,984 A | * | 8/1998 | Bloom ........................ 174/52.3 |
| 5,955,700 A | * | 9/1999 | Slipy et al. .................... 174/50 |
| 6,220,777 B1 | * | 4/2001 | Clarke et al. ................ 403/270 |

FOREIGN PATENT DOCUMENTS

EP        0 557 636 A1        9/1993

* cited by examiner

Primary Examiner—Michael W. Ball
Assistant Examiner—Todd J. Kilkenny
(74) Attorney, Agent, or Firm—Nixon & Vanderhye P.C.

(57) ABSTRACT

In a method of interconnecting two elements (10, 11) of plastic material by welding or gluing together surfaces of the elements a channel (12) is formed in one of said elements, which is divided by partitions (16) into individual spaces distributed longitudinally of the channel. The partitions and the side walls (14, 15) of the channel along the edge surfaces (17, 18, 19, 20) thereof are connected with the other element (11) by welding or gluing together said edge surfaces.

2 Claims, 3 Drawing Sheets

METHOD OF INTERCONNECTING TWO ELEMENTS

BACKGROUND OF THE INVENTION

1. Field of the Invention

The invention relates to a method of interconnecting two elements of plastic material by welding or gluing together surfaces of the elements. The elements to be interconnected can comprise parts of a housing for an electronic unit, particularly a mobile phone, or a housing for one or more batteries to be used in such units.

2. Description of the Prior Art

When elements forming a housing of the kind referred to above are interconnected by welding or gluing such interconnection is effected at edge surfaces of the elements. If the joint between the elements is damaged e.g. by shock against the housing such as when it is dropped to the floor this will result in a connection being opened between the interior of the housing and the surroundings so that foreign matter such as liquids, dust, gases and dirt can penetrate into the interior of the housing, which may be detrimental to the components received therein or to the function thereof.

BRIEF SUMMARY OF THE INVENTION

The purpose of the invention is to overcome this drawback which is achieved by the method of the kind referred above having obtained the characterizing features of claim 1. If the housing formed by the two elements interconnected by the method of the invention is exposed to chock it can be expected that the connection between the two elements is broken only at one side wall of the channel and possibly also at one or two partitions therein and that the connection of the elements otherwise is intact. This means that foreign matter can penetrate into a few compartments and will be trapped therein, no direct connection between the surroundings and the interior of the housing being opened up by the shock. By the invention there is thus produced a tight housing effectively protecting the components received by the housing also under sever conditions, said housing thus being well suited for heavy duty use.

BRIEF DESCRIPTION OF THE DRAWINGS

Illustrative embodiments of the invention will be described with reference to the accompanying drawings in which.

DETAILED DESCRIPTION OF THE INVENTION

Figure 1:
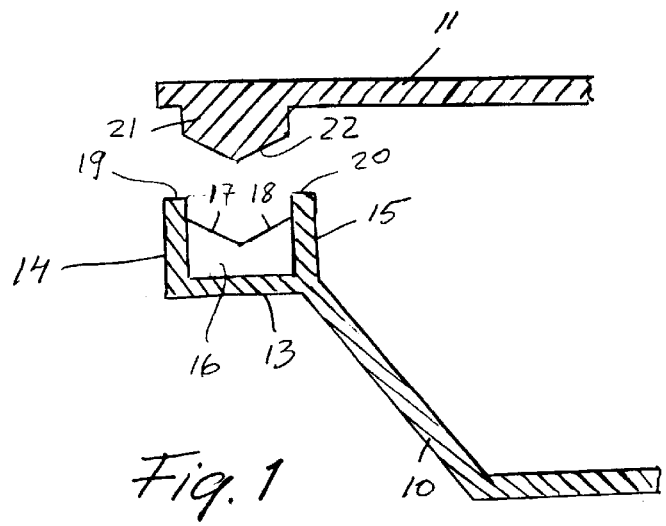
FIG. 1 is a fragmentary cross sectional view of two elements to be interconnected by the method of the invention in one embodiment thereof.
Figure 2:
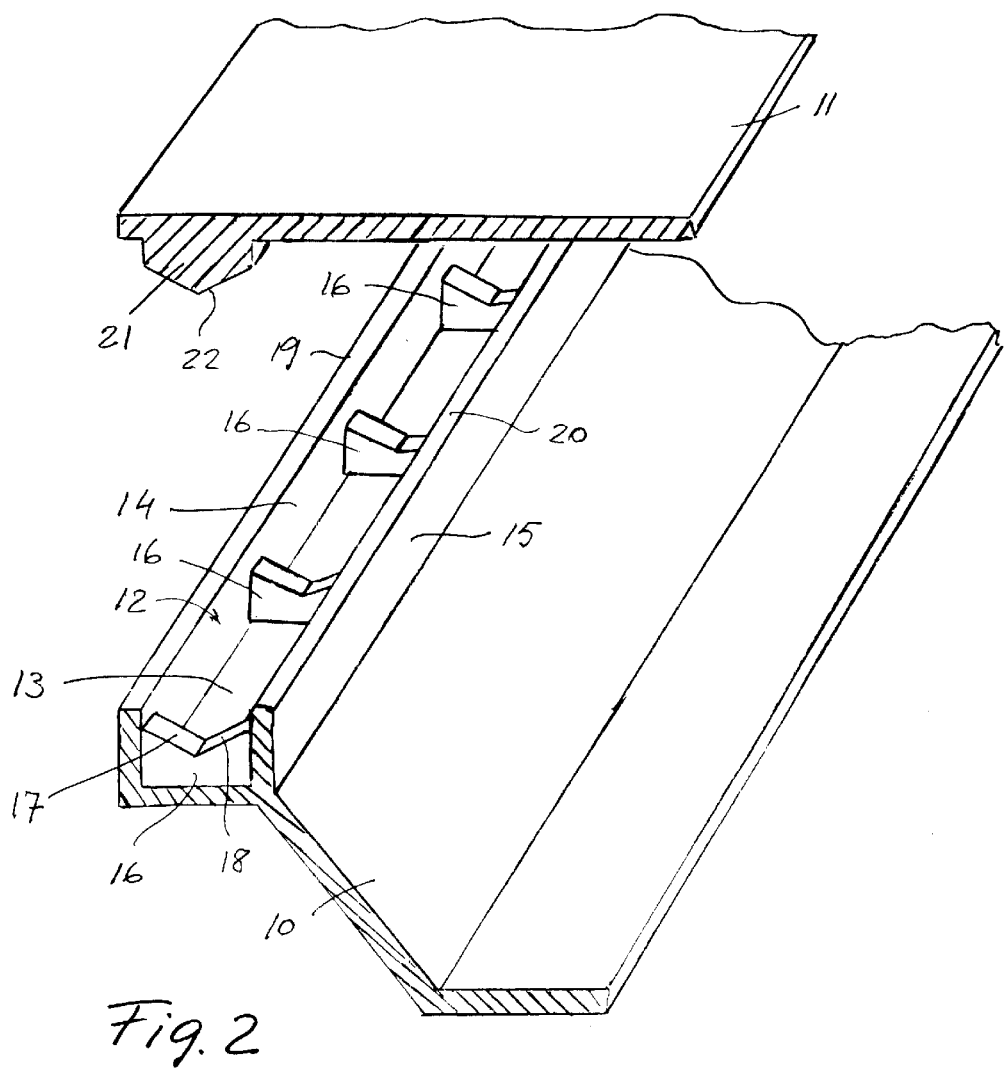
FIG. 2 is a fragmentary perspective view of the elements in FIG. 1.

In the illustrative embodiment disclosed in FIGS. 1 and 2 one element 10 of plastic material forms a trough, and another element 11 also of plastic material is to be connected with the element 10 as a cover to form together with element 10 a watertight housing which shall enclose an electronic unit, a battery or another delicate equipment that has to be protected against foreign matter such as liquids, dust, gases, and dirt, and which is suitable for use under severe conditions. When the method of the invention is applied for interconnecting the two elements a channel 12 is formed at the edge of element 10 said channel having a bottom wall 13 and two side walls, an outer side wall 14 and an inner side wall 15. In the channel there are formed a number of partitions 16 extending transversely of the channel and joining integrally the bottom and side walls thereof. The upper edge of each partition forms two edge surfaces 17 and 18 enclosing an obtuse angle and located slightly below the edge surfaces 19 and 20 of the side walls 14 and 15, respectively.

The other element 11 on the lower side thereof is formed with a rib 21 at the edge of the element. The rib is continuous and has the same extension as the channel 12. The rib has such width that it fits into the channel between the side walls 14 and 15 thereof, and the end surface 22 of the rib forms the same angle as the edge surfaces of the partitions 16. When the two elements 10 and are brought together the rib 21 contacts at the end surface 22 thereof the edge surfaces of the partitions 16 and the lower side of the element 11 is brought into contact with the edge surfaces 19 and 20 of the side walls 14 and 15. Before this is done one of the mutually contacting surfaces is coated with a glue or a solvent for the plastic material of which the elements 10 and 11 are made, in order to sealingly attach the contacting surfaces with each other, or the mutually contacting surfaces after having been brought into contact with each other are interconnected by ultra-sound or friction welding. If welding is applied a positive tolerance can be provided between the rib and the channel surplus material being melted away during welding.

The rib 21 can extend intermittently along the channel rib portions being provided only at the sites opposite to the partitions.

Figure 3:
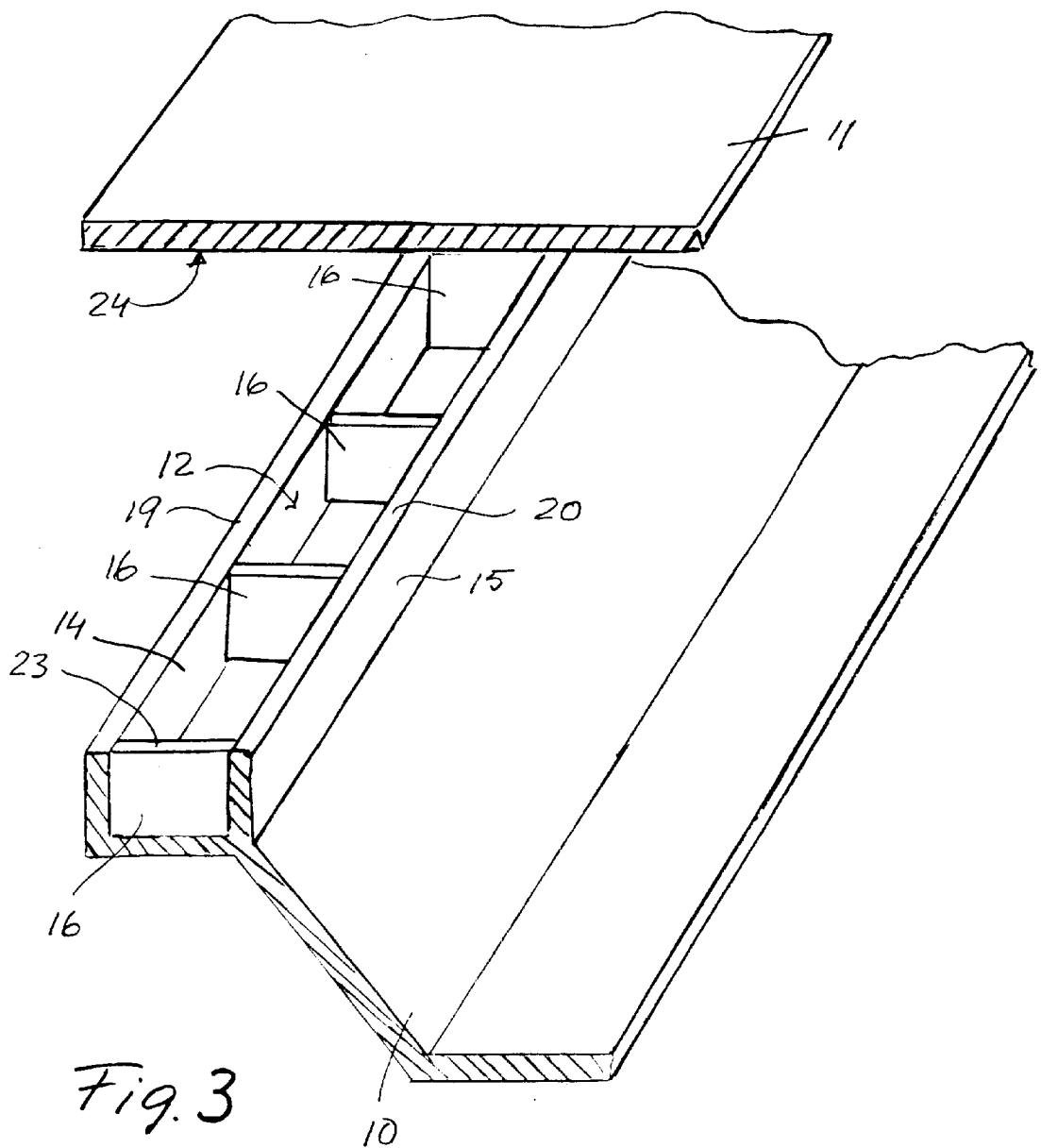
FIG. 3 is a perspective view similar to FIG. 2 of a second embodiment of the invention.

In the embodiment of FIG. 3 the partitions 16 have their edge surfaces 23 flush with the edge surfaces 19 and 20 of the side walls 14 and 15. The element 11 has a plane lower surface 24 which is brought into contact with and welded or glued to the edge surfaces 19, 20 and 23.

Figure 4:
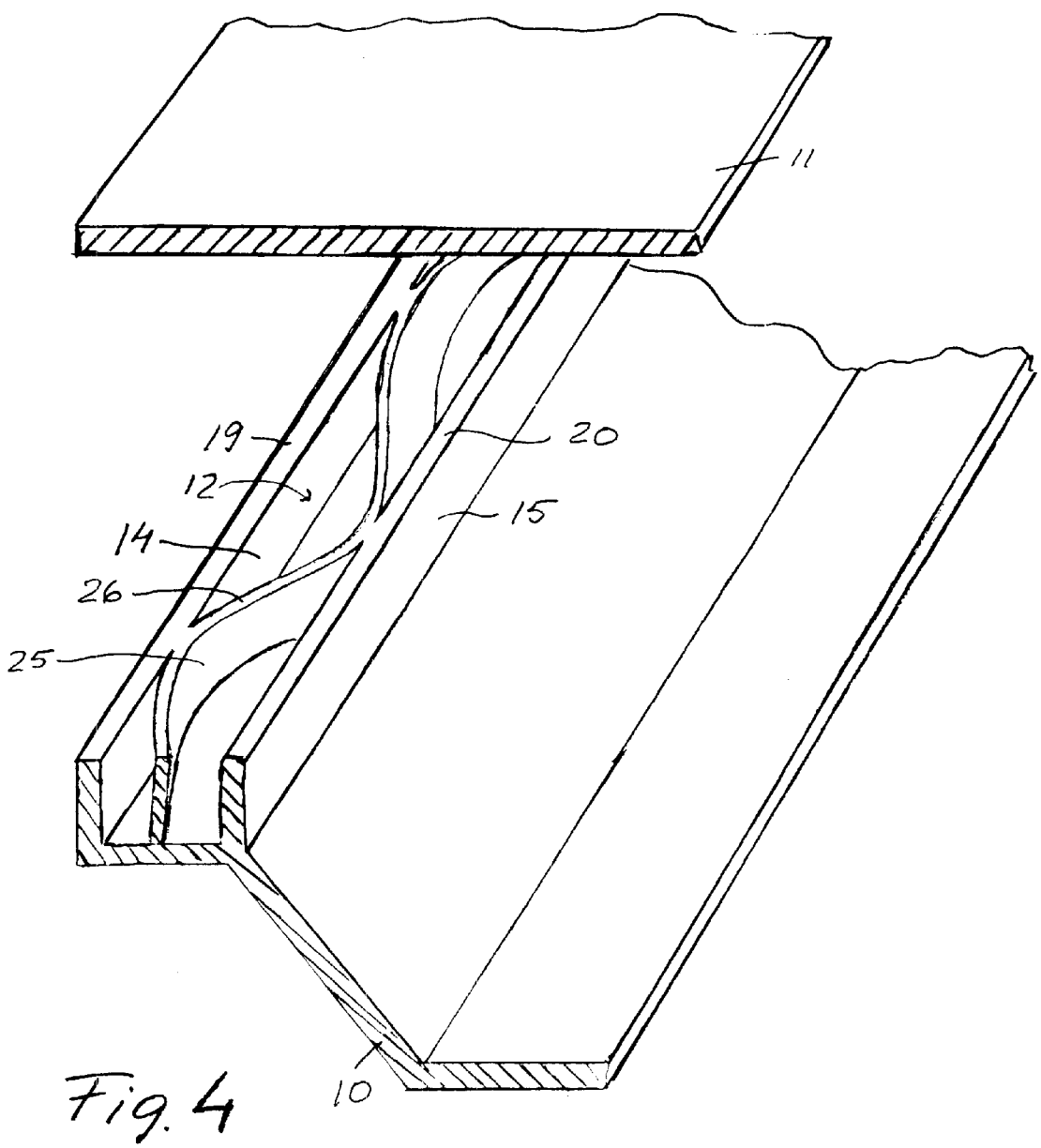
FIG. 4 is a perspective view similar to FIG. 2 of a third embodiment of the invention.

FIG. 4 discloses a further embodiment wherein the partitions are replaced by a waved wall 25 extending along the channel and having the upper edge surface 26 flush with the edge surfaces 19 and 20 of the side walls 14 and 15, the waved wall being integral with the bottom wall 13 and also with the side walls 14 and 15 at the wave peaks of the waved wall.

Any other configuration can be adhered to in order to provide individual closed cells along the joint between the two elements. The bottom wall can be curved transversely and merge into the side walls of the channel as an alternative to the rectangular cross sectional shape in the embodiment of FIGS. 1 to 3.

What is claimed is:

1. A method comprising interconnecting two elements of plastic material by welding or gluing together surfaces of the elements, wherein a channel is formed in one of said elements, said channel being divided by partitions into individual separate and distinct spaces along a length of the channel, and said partitions and the side walls of the channel along the edge surfaces thereof are connected with the other element by welding or gluing together edge surfaces thereof, wherein the partitions are formed as individual transverse walls in the channel, and wherein said other element forms a ridge fitting into a recess formed by an edge surface of each individual transverse wall.

2. A method comprising interconnecting two elements of plastic material by welding or gluing together surfaces of the elements, wherein a channel is formed in one of said elements, said channel being divided by partitions into individual separate and distinct spaces along a length of the channel, and said partitions and the side walls of the channel along the edge surfaces thereof are connected with the other element by welding or gluing together edge surfaces thereof, and wherein the channel has rectangular cross sectional shape and the partitions are formed by a waved wall extending along the length of the channel and being connected to the bottom and side walls thereof.

* * * * *